3,211,462
CONTINUOUS RING SHAFT SEALS
Donald F. Durham and Gilbert D. Minor, Peoria, Ill., assignors to Caterpillar Tractor Co., Peoria, Ill., a corporation of California
Filed Dec. 15, 1961, Ser. No. 159,570
3 Claims. (Cl. 277—94)

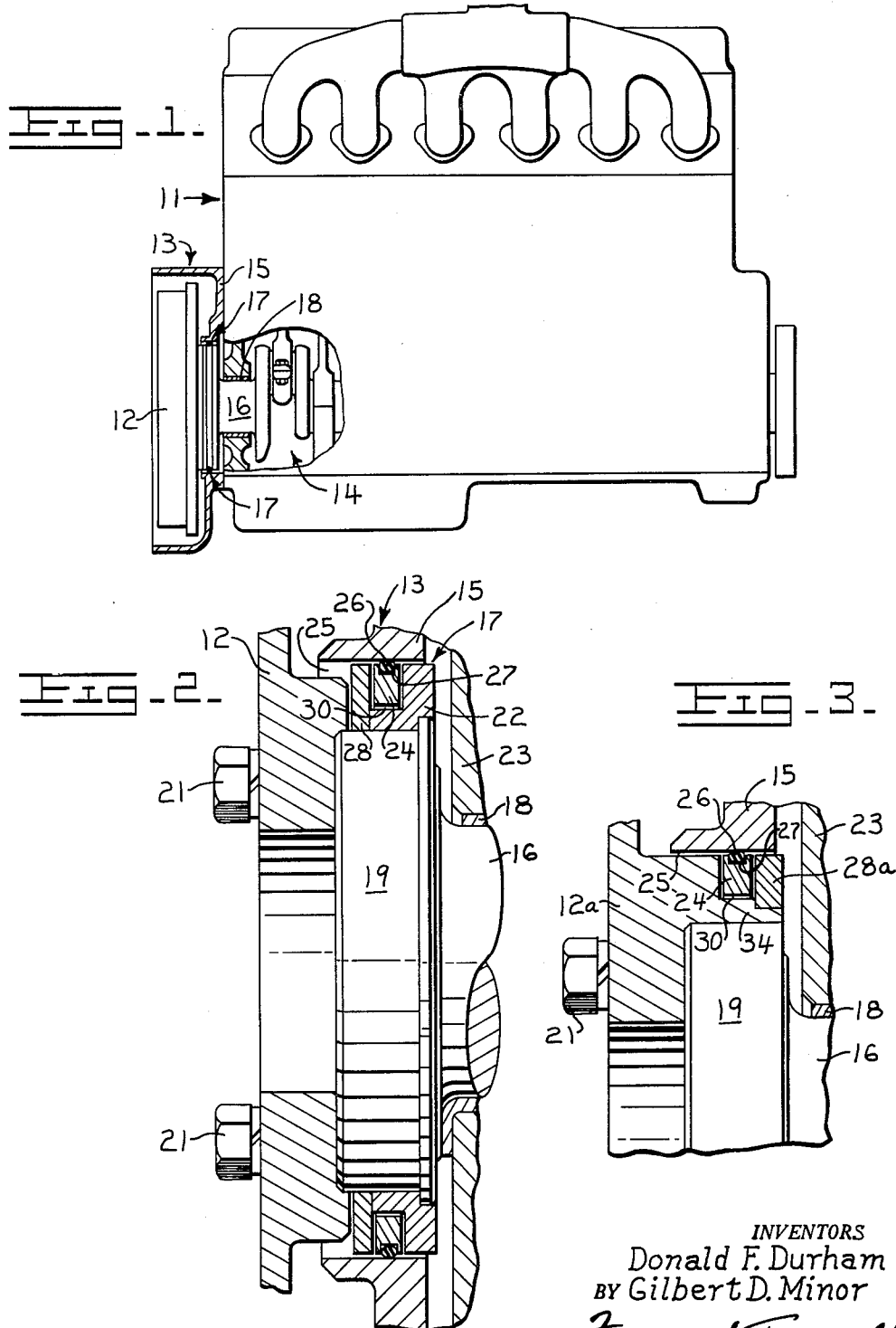

The present invention relates to seals, and more particularly to seals utilized in conjunction with rotating shafts which extend out of a chamber which contains lubricant.

When a rotating shaft, such as a crankshaft which is used in internal combustion engines, passes out of a chamber in which lubricant, such as oil, is contained, sealing means must be provided around the shaft to prevent leakage. The problem of providing such a sealing means, which is effective in preventing leakage without interfering with the shaft's rotation, has received much attention for a number of years. The result has been that numerous such sealing means have been developed and employed. All but a few, however, have been found unsatisfactory in one respect or another.

One seal for a rotating shaft which has been widely used employs a metal ring that resides in a generally rectangular groove, with a deformable O-ring carried on the outer circumferential surface of the ring. Since the ring when in place in the seal resides within the confines of a groove, it is the practice to split the ring at one point in its circumference to enable it to be temporarily deformed. With the ring properly deformed, it can be placed into the groove, after which it is allowed to return to its original shape and size. These split ring seals, as they are known, have two major deficiencies, however, which often have caused their performance to be less than satisfactory. These deficiencies are the tendency for oil to pass through the break in the ring, and the tendency of the ring to tighten up in the groove, due to the allowable play provided by the break in the ring. When the ring tightens up, excessive wear occurs to the O-ring causing quick failure of the seal.

As is generally known in the art, a flywheel is conventionally attached to one end of an engine crankshaft and resides in a housing which is separate from the housing which encases the rest of the engine. A problem arises in preventing the lubricating oil from the engine compartment, out of which the crankshaft extends, from entering the flywheel housing, where the crankshaft terminates, and at the same time not impeding the rotation of the crankshaft. This problem has been met by the use of shaft seals as described above, but the disadvantages inherent in split ring seals have been suffered with the accompanying result of frequent seal failure. Because of the time required to replace a shaft seal on the crankshaft between the engine compartment and the flywheel housing, a more dependable seal, eliminating some of the causes of failure is, of course, highly desirable.

Accordingly, it is an object of the present invention to provide a rotating shaft seal employing a continuous seal ring in combination with an O-ring.

Further and more specific objects and advantages of the invention are made apparent in the following specification wherein a preferred form of the invention is described with reference to the accompanying drawings.

In the drawings:

FIG. 1 is a schematic illustration of an engine with a portion broken away to show the invention as applied to an engine flywheel, and its relation to adjacent parts;

FIG. 2 is an enlarged fragmentary sectional view of the general area where the crankshaft of the engine passes into the flywheel housing with the present invention employed to form a seal therebetween; and FIG. 3 is a view similar to FIG. 2 wherein an alternate embodiment of the invention is illustrated.

Referring now to FIG. 1, an engine generally illustrated at 11 has a flywheel 12 residing in a flywheel housing 13 which is adjacent to the engine compartment 14, and has a wall 15 disposed against the engine. Flywheel 12 is secured to crankshaft 16 for rotation therewith. Engine compartment 14 is supplied with relatively large quantities of lubricating oil to prevent excessive wear of the various moving parts contained therein while flywheel housing 13 is preferably maintained dry. To prevent the oil in engine compartment 14 from passing into flywheel housing 13 a seal generally indicated at 17 is provided therebetween. A thrust bearing 18 supporting crankshaft 16 requires lubricating oil in the area of the flywheel housing. This oil, coupled with the fact that the air pressure in the engine compartment is usually higher than in the flywheel housing, creates a necessity for an efficient and dependable seal in this area.

Referring now to FIG. 2, crankshaft 16 terminates in an annular flange 19 onto which flywheel 12 is secured as by cap screws 21. Flange 19 also serves as a mount for seal 17 within an opening 25 in the flywheel housing. The seal comprises an annular carrier 22, having a generally L-shaped cross section, pressed onto flange 19 with its greatest outside diameter adjacent the engine wall 23. A continuous metal ring 24 encircles the smaller portion of the carrier 22. Ring 24 has a deformable O-ring 26 retained in a groove 27 formed in its outer circumferential surface and this O-ring is compressed between the inside of opening 25 and the groove in ring 24.

A retainer ring 28 is pressed onto flange 19 and, with carrier 22, forms a groove which provides a running fit for ring 24. Thus when flange 19 rotates with the crankshaft, carrier 22 and retainer 28 also rotate, but ring 24 is maintained stationary due to the engagement of O-ring 26 in opening 25. Ring 24 runs freely in groove 30, presenting an effective seal, because of the rotation of the groove forming members, any oil seeping into the groove between the groove and the ring 24 is forced radially outward by the centrifugal force created by the rotating member.

Ring 24 being continuous, does not afford the opportunity for leakage of a split ring and cannot be compressed or contracted to permit slippage of the O-ring 26.

Referring now to FIG. 3, the sealing means between the housing 13 and the engine compartment 14 (see FIG. 1) is similar to that described in connection with FIG. 2 in that a continuous ring 24 supports an O-ring 26 in opening 25. Again, the continuous nature of ring 24 eliminates the disadvantages of split ring seals. The groove in which ring 24 resides is provided in a manner which differs slightly from that of FIG. 2, however.

Flywheel 12a has an annular extension 34 which embraces flange 19. The extension 34 is stepped to provide space for the ring 24, and a retaining ring 28a is pressed into place to complete the groove 30a for the sliding reception of ring 24. Prior to flywheel 12a being secured to flange 19 ring 24, O-ring 26 and ring 28a are assembled on its extension 34. This embodiment, while requiring a flywheel of special designing has the advantage of utilizing an integral portion of the flywheel for cooperation with the sealing means so as to eliminate one of the parts required with the embodiment of FIG. 2.

Thus the present invention by providing means by which a continuous ring can be utilized in the sealing means, eliminates two major drawbacks to similar sealing means employing a split ring.

While only two embodiments of the present invention have been illustrated, and both in conjunction with a crankshaft and flywheel, it will be apparent to those familiar with the art and the invention is applicable for use in many structures in which superior sealing means is desired between a rotating shaft and an opening through which it extends.

We claim:
1. A seal for use in conjunction with a rotating shaft which passes out of an opening in a chamber containing lubricant, comprising in combination;
 a first annular groove forming member;
 a second separate annular groove forming member;
 said first groove forming member defining two adjacent sides of a generally rectangular annular groove;
 said second groove forming member in fixed relation to said first member and forming the third side of the generally rectangular annular groove;
 said first member and said second member coaxially secured on the shaft;
 a continuous metal seal ring residing in the groove formed by the first and second members; and
 a deformable O-ring mounted on the outer circumferential surface of said seal ring and in firm engagement with the defining boundaries of the opening so as to hold it against rotation.

2. A seal for use in conjunction with a rotating shaft which passes out of an opening in a chamber containing lubricant, comprising in combination;
 an annular carrier member having a generally L-shaped cross section coaxially secured on the shaft;
 an annular separate retaining member coaxially secured on the shaft and in abutment with said carrier so as to form an annular groove therewith, the groove lying generally in the plane of the chamber opening;
 a continuous metal seal ring residing in the groove formed by said carrier member and said retaining member without contacting either, the width of said ring being slightly less than the width of the groove; and
 a deformable O-ring on the outer circumferential surface of said seal ring, wherein the outside diameter of said seal ring is of such magnitude that said O-ring is in firm engagement with the walls of the housing opening.

3. A seal for use in conjunction with a crankshaft which extends out of an opening in the chamber in which the majority of it resides into a flywheel housing where a flywheel is mounted on a circular flange on the end of the shaft, comprising in combination;
 an integral, annular extension of the flywheel circumjacent to the circumferential surface of the crankshaft flange;
 said annular extension having an outer cylindrical surface coaxial with the shaft and an annular surface forming a generally right angle with the cylindrical surface, the cylindrical and annular surfaces on said extension defining two sides of an annular, generally rectangular groove;
 a separate retaining member in fixed relation to said extension of the flywheel, defining the third side of the annular groove;
 a continuous metal seal ring residing in the annular groove without contacting the sides defining it; and
 a deformable O-ring disposed on the outer circumferential surface of said seal ring and in firm engagement with the walls of the chamber opening through which the shaft extends.

References Cited by the Examiner

UNITED STATES PATENTS

| 2,023,338 | 12/35 | Morgan | 277—187 |
| 2,162,218 | 6/39 | Hill | 277—68 XR |
| 2,570,427 | 10/51 | Chillson et al. | 277—25 |
| 2,916,314 | 12/59 | Secord et al. | 277—92 |
| 3,023,014 | 2/62 | Donner | 277—173 X |

FOREIGN PATENTS 632,957 12/49 Great Britain.

LEWIS J. LENNY, *Primary Examiner.*
SAMUEL ROTHBERG, *Examiner.*